(12) United States Patent
Chiu et al.

(10) Patent No.: US 9,842,054 B2
(45) Date of Patent: Dec. 12, 2017

(54) COMPUTING DEVICE AND METHOD FOR PROCESSING DATA IN CACHE MEMORY OF THE COMPUTING DEVICE

(71) Applicant: HON HAI PRECISION INDUSTRY CO., LTD., New Taipei (TW)

(72) Inventors: Chun-Hsieh Chiu, New Taipei (TW); Hsiang-Ting Cheng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 365 days.

(21) Appl. No.: 14/793,972

(22) Filed: Jul. 8, 2015

(65) Prior Publication Data

US 2017/0010969 A1    Jan. 12, 2017

(51) Int. Cl.
  *G06F 12/08*    (2016.01)
  *G06F 12/0871*  (2016.01)

(52) U.S. Cl.
  CPC .... *G06F 12/0871* (2013.01); *G06F 2212/282* (2013.01)

(58) Field of Classification Search
  CPC .................. G06F 12/0871; G06F 2212/282
  See application file for complete search history.

(56) References Cited

U.S. PATENT DOCUMENTS

| | | | | |
|---|---|---|---|---|
| 4,371,929 A * | 2/1983 | Brann | ................... | G06F 12/084 700/5 |
| 4,905,141 A * | 2/1990 | Brenza | ................ | G06F 12/0846 711/129 |
| 6,493,800 B1 * | 12/2002 | Blumrich | .............. | G06F 12/084 711/129 |
| 6,694,407 B1 * | 2/2004 | May | ..................... | G06F 12/0842 711/129 |
| 7,536,529 B1 * | 5/2009 | Chatterjee | ............. | G06F 3/0608 711/111 |
| 8,321,630 B1 * | 11/2012 | Vaid | ..................... | G06F 12/0871 711/104 |
| 2001/0010065 A1 * | 7/2001 | Chiba | .................... | G06F 3/0611 711/103 |
| 2003/0236947 A1 * | 12/2003 | Yamazaki | ............. | G06F 12/084 711/128 |
| 2011/0010503 A1 * | 1/2011 | Yamamura | ............ | G06F 12/121 711/128 |
| 2011/0055827 A1 * | 3/2011 | Lin | ...................... | G06F 12/0842 718/1 |
| 2011/0276744 A1 * | 11/2011 | Sengupta | ............ | G06F 12/0866 711/103 |

(Continued)

*Primary Examiner* — David X Yi
*Assistant Examiner* — Ramon A Mercado
(74) *Attorney, Agent, or Firm* — Steven Reiss

(57) ABSTRACT

In a method for processing cache data of a computing device, a storage space of the storage device is divided into sections, and a section number of each data block in the storage device is determined according one of the sections in the storage device which each data block belongs to. A field is added for each data block in the storage device to record a section number of each data block in the storage device. When the cache data in the cache memory requires to be written back to the storage device, cache data with the section number is searched from all of the cache data in the cache memory to be written back to a corresponding section in the storage device.

15 Claims, 4 Drawing Sheets

(56) References Cited

U.S. PATENT DOCUMENTS

| | | | |
|---|---|---|---|
| 2012/0054445 A1* | 3/2012 | Swart | G06F 12/0888 711/133 |
| 2012/0210041 A1* | 8/2012 | Flynn | G06F 1/183 711/3 |
| 2013/0185508 A1* | 7/2013 | Talagala | G06F 12/0888 711/118 |
| 2013/0238855 A1* | 9/2013 | Satran | G06F 12/0871 711/118 |
| 2013/0297879 A1* | 11/2013 | Abali | G06F 12/0864 711/128 |

* cited by examiner

US 9,842,054 B2

COMPUTING DEVICE AND METHOD FOR PROCESSING DATA IN CACHE MEMORY OF THE COMPUTING DEVICE

FIELD

The subject matter herein generally relates to data processing technology, and particularly to a computing device and a method for processing data in a cache memory of the computing device.

BACKGROUND

The cache memory is a smaller, faster memory which stores copies of data frequently used from a main storage devices (for example, a hard disk). When a processor needs to read data from or write data to the main storage devices, the processer reads the data from or writes the data to the cache memory (hereinafter referred as "cache data"). If the cache data in the cache memory is modified, the cache data needs to be written back to the main storage devices.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
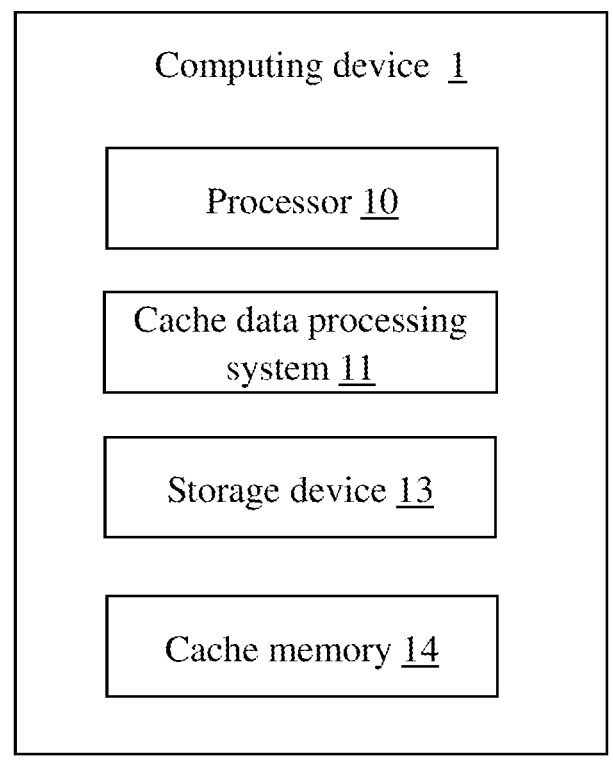
FIG. 1 is a block diagram of an example embodiment of a computing device including a cache data processing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 illustrates a block diagram of an example embodiment of a computing device. In at least one embodiment, as shown in FIG. 1, a computing device 1 can include, but is not limited to, at least one processor 10, a cache data processing system 11, a storage device 13, and a cache memory 14. FIG. 1 illustrates only one example of the computing device 1, other examples can comprise more or fewer components than those shown in the embodiment, or have a different configuration of the various components.

The at least one processor 10 executes one or more computerized codes and other applications of the computing device 1 to provide functions of the computing device 1. The storage device 13 is a physical storage media for storing data of the computing device 1, for example, a hard disk. In at least one embodiment, the storage device 13 includes a plurality of sectors for storing the data of the computing device 1. The cache memory 14 is a cache media for storing cache data which are copies of data frequently and recently used in the storage device 13, for example, a solid state disk (SSD). In at least one embodiment, when the data in the storage device 13 is stored into the cache memory 14, a location of the data in the cache memory 14 can be determined according to the location of the data in the storage device 13 and a preset HASH function, that is, there is a preset corresponding relationship between a storage space of the storage device 13 and a memory space of the cache memory 14.

Figure 2:
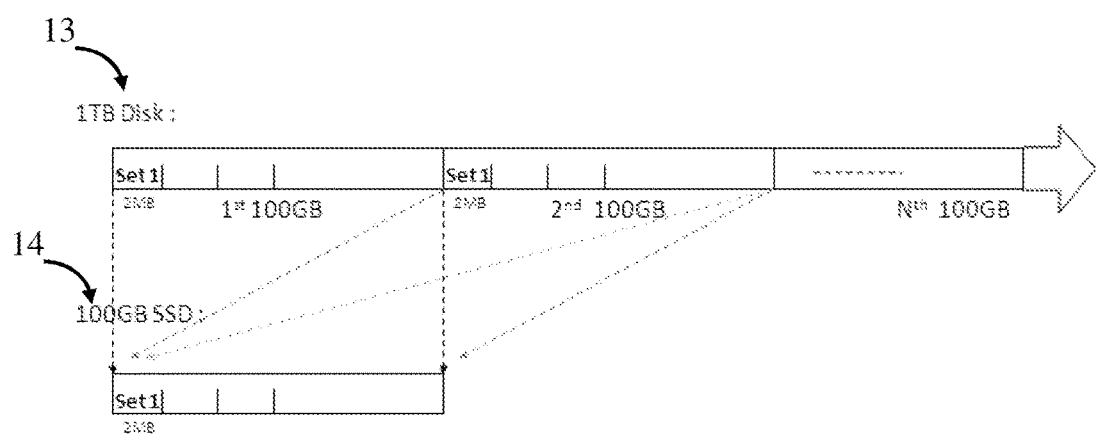
FIG. 2 is a diagrammatic view of an example embodiment of a relationship between a storage device and a cache memory.

In at least one embodiment, the memory space of the cache memory 14 is divided into a preset number of sets (512 sectors of a disk being determined as a set) according to the memory capacity of the cache memory 14. As shown in FIG. 2, for example, if each set can store data with a size of 2 MB (mega byte), the memory space of the cache memory 14 can be divided into 5000 sets when the memory capacity of the cache memory 14 is 100 GB (Gigabyte) ("100 GB SSD" shown in FIG. 2). The storage space of the storage device 13 can be divided into a plurality of sections according to the storage capacity of the storage device 13 and the memory capacity of the cache memory 14, and each section can be divided into the preset number of sets corresponding to the cache memory 14.

For example, in FIG. 2, if the memory capacity of the storage device 13 is 1 TB (Terabyte) ("1 TB Disk" shown in FIG. 2) and the memory capacity of the cache memory 14 is 100 GB, the storage space of the storage device 13 is divided into 10 sections including the 1st 100 GB, the 2st 100 GB, . . . and the 10th 100 GB. Each of the sections can be divided into 5000 sets. Each set of different sections of the storage device 13 can map a corresponding set in the cache memory 14. For example, in FIG. 2, data of one or more "set 1" in different sections of the storage device 13 can be distributed in the "set 1" of the cache memory 14.

Figure 3:
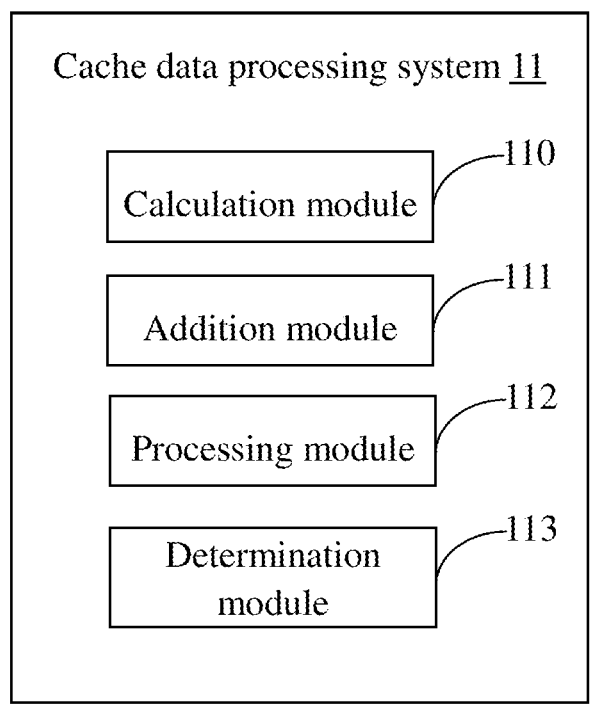
FIG. 3 is a block diagram of an example embodiment of the cache data processing system of the computing device of FIG. 1.

FIG. 3 is a block diagram of an example embodiment of the cache data processing system of the computing device of FIG. 1. In at least one embodiment, the cache data processing system 11 can include, but is not limited to, a calculation module 110, an addition module 111, a processing module 112, and a determination module 113. The modules 110-113 can include computerized instructions in the form of one or more computer-readable programs that can be stored in a non-transitory computer-readable medium, such as the storage device 13, and be executed by the at least one processor 10 of the computing device 1.

The calculation module 110 determines a section number of each data block (for example, data block in each sector (not shown) of a disk) of in the storage device 13 according to which section each data block belongs to. In at least one embodiment, the calculation module 110 can divide the storage capacity of the storage device 13 according to the memory capacity of the cache memory 14, and divide the storage space of the storage device 13 into a plurality of sections including the 1st section, the 2nd section, . . . and the Nth section. Then the calculation module 110 determines a section number of each data block by determining which section in the storage device 13 each data block belongs to. For example, if the data block belongs to the 1st section, the section number of the data block is 1.

The addition module 112 adds a field for each data block to record a section number of each data block in the storage device 13. The added field records which section each data block belongs to. For example, if the data block belongs to the 1st section, the added field can record the second number of 1 for the data block. After the addition module 112 adds the added field for each data block, the data in the storage device 13 can be stored as cache data in the cache memory 14 according to actual requirements (for example, quick access of the data frequently used in the storage device 13).

When the cache data in the cache memory 14 needs to write back to the storage device 13 (for example, after the cache data is modified and the computing device 1 needs to be shut down), the processing module 113 searches for cache data with the section number of N from all of the cache data in the cache memory 13, and writes the searched cache data back to a corresponding section in the storage device 14. The initial value of N is set to 1. In other embodiments, the initial value of the N can be preset according actual requirements. That is, the processing module 113 first scans all sets in the cache memory 13 and searches for the cache data with the section number of 1 recorded in the added field of the cache data. The processing module 113 writes the searched cache data with the section number of 1 in each set sequentially back to a corresponding set of the 1th section in the storage device 13.

After the cache data with the section number of N is written into the corresponding section (for example, the Nth section) in the storage device 13, the determination module determines whether all of the cache data in the cache memory 14 is written back to the storage device 13.

If there is no cache data with the section number of N in the cache memory 14 or if there is the cache data which is not written back to the storage device 13, the processing module 115 increases the section number N by one to make N=N+1, and searches for the cache data with the increased section number N in the cache memory 14. For example, after the processing module 113 writes the cache data with the section number of 1 in each set sequentially back to a corresponding set of the 1th section in the storage device 13, the processing module 113 writes the cache data with the section number of 2 in each set sequentially back to a corresponding set of the 2th section in the storage device 13.

Figure 4:
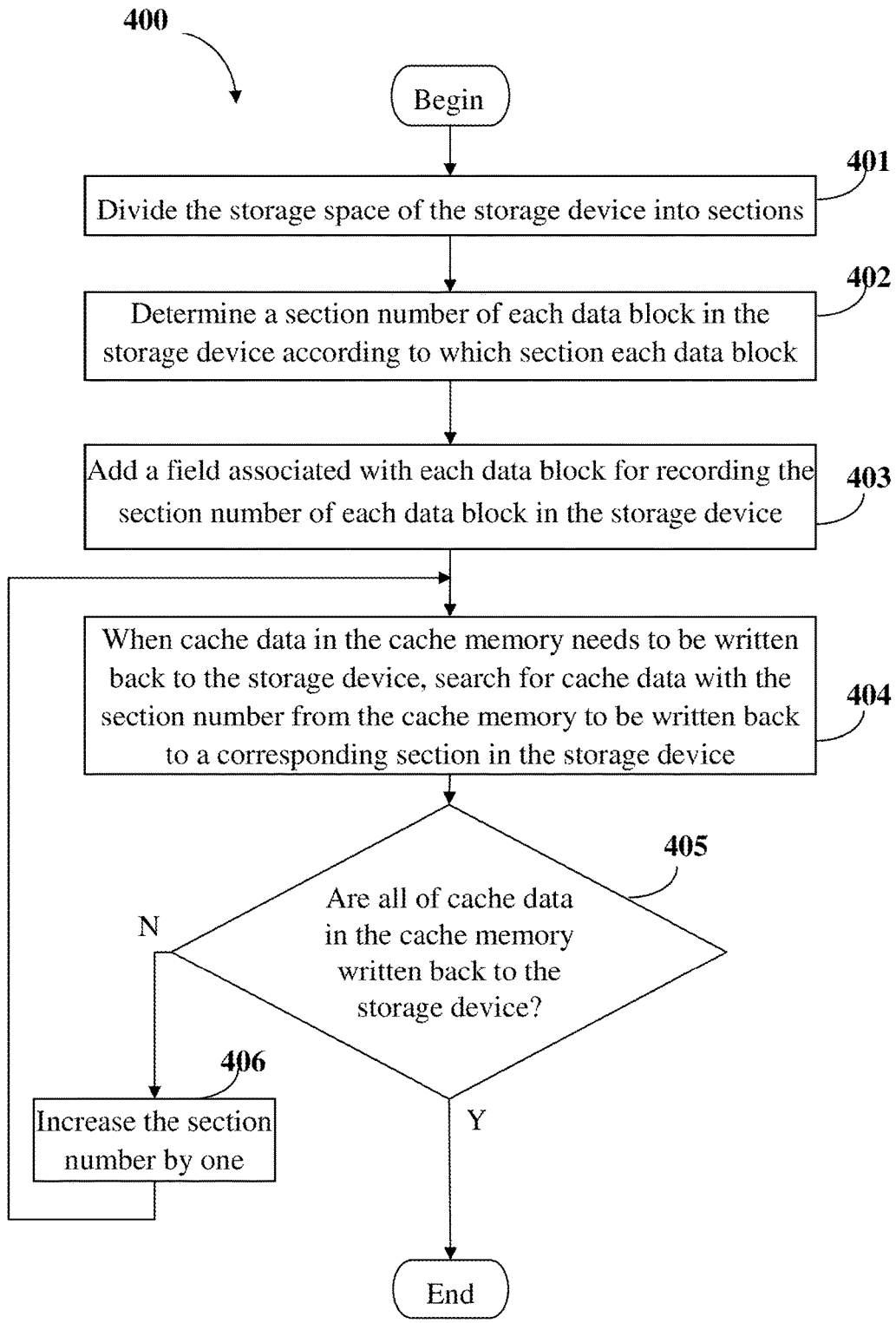
FIG. 4 is a flowchart of an example embodiment of a method of processing cache data using the computing device of FIG. 1.

Referring to FIG. 4, a flowchart is presented in accordance with an example embodiment. An example method 400 is provided by way of example, as there are a variety of ways to carry out the method. The example method 400 described below can be carried out using the configurations illustrated in FIGS. 1-3, for example, and various elements of these figures are referenced in explaining the example method 400. Each block shown in FIG. 4 represents one or more processes, methods, or subroutines, carried out in the example method 400. Furthermore, the illustrated order of blocks is illustrative only and the order of the blocks can be changed. Additional blocks can be added or fewer blocks can be utilized without departing from this disclosure. The example method 400 can begin at block 401.

At block 401, a calculation module divides the storage space of the storage device 13 into a plurality of sections according to the storage capacity of the storage device 13 and the memory capacity of the cache memory 14. In at least one embodiment, the calculation module can divide the storage capacity of the storage device 13 according to the memory capacity of the cache memory 14, and divide the storage space of the storage device 13 into a plurality of sections including the 1st section, the 2nd section, . . . and the Nth section.

At block 402, the calculation module determines a section number of each data block in the storage device 13 according to which section each data block belongs to.

At block 403, an addition module adds a field for each data block to record a section number of each data block in the storage device 13. The added field records which section each data block belongs to. For example, if the data block belongs to the 1st section, the added field can record the second number of 1 for the data block. After the addition module adds a field for each data block, the data in the storage device 13 can be stored as cache data in the cache memory 14 according to actual requirements (for example, quick access of the data frequently used in the storage device 13).

At block 404, when the cache data in the cache memory 14 needs to write back to the storage device 13 (for example, after the cache data is modified and the computing device 1 needs to be shut down), a processing module searches for cache data with the section number of N from all of the cache data in the cache memory 13, and writes the searched cache data back to a corresponding section in the storage device 14. The initial value of N is set to 1. That is, the processing module first scans all sets in the cache memory 13 and searches for the cache data with the section number of 1 recorded in the added field of the cache data. The processing module writes the searched cache data with the section number of 1 in each set sequentially back to a corresponding set of the 1th section in the storage device 13.

In at least one embodiment, if there is no cache data with the section number of N in the cache memory 14, the processing module searches for the cache data with the section number of N+1 recorded in the added field of the cache data.

At block 405, after the cache data with the section number of N is written back into the 1th section in the storage device 13, a determination module determines whether all of the cache data in the cache memory 14 is written back to the storage device 13. If all of the cache data in the cache memory 14 is written back to the storage device 13, the procedure ends. If there is the cache data which is not written back to the storage device 13, block 406 is implemented.

At block 406, the processing module increases the section number N by one to make N=N+1, and block 404 is implemented.

All of the processes described above can be embodied in, and fully automated via, functional code modules executed by one or more general purpose processors such as the processor 10. The code modules can be stored in any type of non-transitory readable medium or other storage device such as the storage device 13. Some or all of the methods can alternatively be embodied in specialized hardware. Depending on the embodiment, the non-transitory readable medium can be a hard disk drive, a compact disc, a digital versatile disc, a tape drive, or other storage medium.

The described embodiments are merely examples of implementations, and have been set forth for a clear understanding of the principles of the present disclosure. Variations and modifications can be made without departing substantially from the spirit and principles of the present disclosure. All such modifications and variations are intended to be included within the scope of this disclosure and the described inventive embodiments, and the present disclosure is protected by the following claims and their equivalents.

What is claimed is:

1. A computing device comprising:
    a storage device for storing data of the computing device;
    a cache memory for storing cache data which are copies of data frequently and recently used in the storage device;
    at least one processor coupled to the storage device and configured to execute instructions stored on the storage device that cause the at least one processor to:
    divide, before storing the data of the storage device into the cache memory, a storage space of the storage device into a plurality of sections according to a storage capacity of the storage device and a memory capacity of the cache memory;
    determine a section number, corresponding to one of the plurality of sections, of each data block in the storage device;
    add a field associated with each data block in the storage device, the field being configured to record a section number of each data block in the storage device;
    search, when the cache data in the cache memory requires to be written back to the storage device, for cache data with a section number from all of the cache data in the cache memory;
    write the searched cache data back to a corresponding section in the storage device;
    increase the section number by one after the cache data with the section number is written back to the storage device; and
    search, until all of the cache data in the cache memory are written back to the storage device, for the cache data with the increased section number in the cache memory to be written back to the storage device.

2. The computing device of claim 1, wherein the at least one processor further increases the section number by one and search for the cache data with the increased section number in the cache memory, when there is no cache data with the section number in the cache memory.

3. The computing device of claim 1, wherein when the data in the storage device is stored into the cache memory, a location of the data in the cache memory is determined according to a location of the data in the storage device and a preset HASH function.

4. The computing device of clam 3, wherein the memory space of the cache memory is divided into a preset number of sets according to the memory capacity of the cache memory, and each of the sections in the storage device is divided into the preset number of sets corresponding to the cache memory.

5. The computing device of claim 4, wherein the at least one processor further writes the searched cache data with the section number in each set of the cache memory sequentially back to a corresponding set of the corresponding section in the storage device.

6. A computer-based method for processing cache data of a computing device, the computing device comprising a storage device and a cache memory, the method comprising:
    dividing, before storing the data of the storage device into the cache memory, a storage space of the storage device into a plurality of sections according to a storage capacity of the storage device and a memory capacity of the cache memory;
    determining a section number of each data block in the storage device according to one of the sections in the storage device which each data block belongs to;
    adding a field for each data block in the storage device to record a section number of each data block in the storage device;
    searching, when the cache data in the cache memory requires to be written back to the storage device, for cache data with the section number from all of the cache data in the cache memory;
    writing the searched cache data back to a corresponding section in the storage device;
    increasing the section number by one after the cache data with the section number is written back to the storage device; and
    searching, until all of the cache data in the cache memory are written back to the storage device, for the cache data with the increased section number in the cache memory to be written back to the storage device.

7. The method of claim 6, further comprising:
    increasing the section number by one and search for the cache data with the increased section number in the cache memory, when there is no cache data with the section number of in the cache memory.

8. The method of claim 6, wherein when the data in the storage device is stored into the cache memory, a location of the data in the cache memory is determined according to a location of the data in the storage device and a preset HASH function.

9. The method of claim 8, wherein the memory space of the cache memory is divided into a preset number of sets according to the memory capacity of the cache memory, and each of the sections in the storage device is divided into the preset number of sets corresponding to the cache memory.

10. The method of claim 9, further comprising:
    writing the searched cache data with the section number of N in each set of the cache memory sequentially back to a corresponding set of the corresponding section in the storage device.

11. A non-transitory computer-readable medium having stored thereon instructions that, when executed by at least one processor of a computing device, the computing device comprising a storage device and a cache memory, causing the computing device to perform a method for processing cache data of the computing device, the method comprising:
    dividing, before storing the data of the storage device into the cache memory, a storage space of the storage device into a plurality of sections according to a storage capacity of the storage device and a memory capacity of the cache memory;

determining a section number of each data block in the storage device according to one of the sections in the storage device which each data block belongs to;

adding a field for each data block in the storage device to record a section number of each data block in the storage device;

searching, when the cache data in the cache memory requires to be written back to the storage device, for cache data with the section number from all of the cache data in the cache memory;

writing the searched cache data back to a corresponding section in the storage device;

increasing the section number by one after the cache data with the section number is written back to the storage device; and searching, until all of the cache data in the cache memory are written back to the storage device, for the cache data with the increased section number in the cache memory to be written back to the storage device.

12. The non-transitory computer-readable medium of claim 11, wherein the method further comprises:

increasing the section number by one and search for the cache data with the increased section number in the cache memory, when there is no cache data with the section number of in the cache memory.

13. The non-transitory computer-readable medium of claim 11, wherein when the data in the storage device is stored into the cache memory, a location of the data in the cache memory is determined according to a location of the data in the storage device and a preset HASH function.

14. The non-transitory computer-readable medium of claim 13, wherein the memory space of the cache memory is divided into a preset number of sets according to the memory capacity of the cache memory, and each of the sections in the storage device is divided into the preset number of sets corresponding to the cache memory.

15. The non-transitory computer-readable medium of claim 14, wherein the method further comprises:

writing the searched cache data with the section number of N in each set of the cache memory sequentially back to a corresponding set of the corresponding section in the storage device.

* * * * *